UNITED STATES PATENT OFFICE.

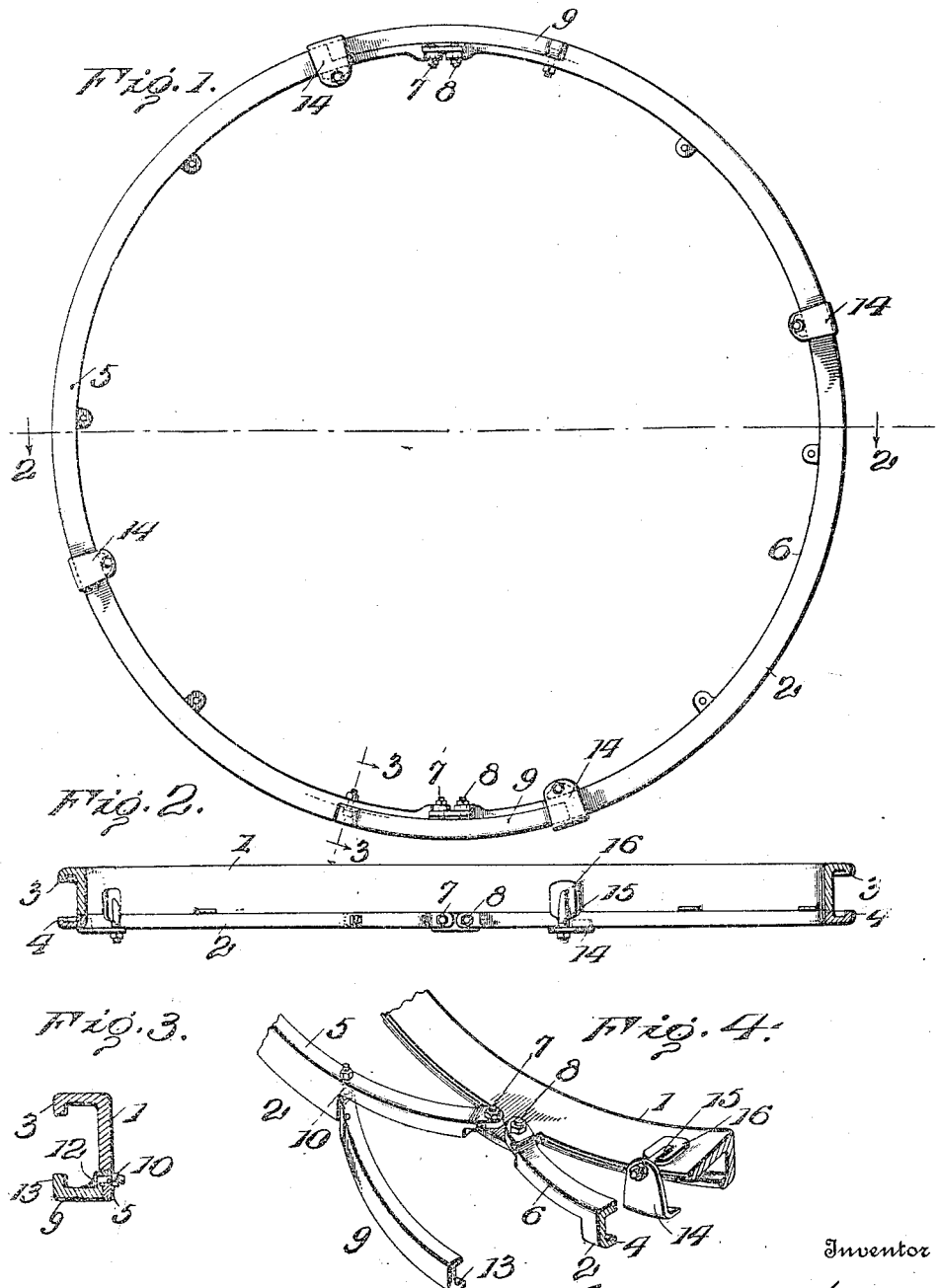

BERTRAND A. WEINBERG, OF WEDGEFIELD, SOUTH CAROLINA.

WHEEL-RIM.

1,283,608.  Specification of Letters Patent.  Patented Nov. 5, 1918.

Application filed June 12, 1916. Serial No. 103,179.

*To all whom it may concern:*

Be it known that I, BERTRAND A. WEINBERG, of Wedgefield, in the county of Sumter and State of South Carolina, have invented certain new and useful Improvements in Wheel-Rims; and I do hereby declare the following to be a full, clear, and exact description of the invention, such as will enable others skilled in the art to which it appertains to make and use the same.

My invention contemplates a simple and effective demountable rim for wheels preferably the wheels of automobiles equipped with pneumatic tires.

In the accompanying drawing, Figure 1 shows a side elevation of a wheel embodying my invention. Fig. 2 is a transverse section on the line 2—2 of Fig. 1. Fig. 3 is a section on line 3—3, Fig. 1, and Fig. 4 is a detail in perspective.

Referring to the drawing, I have shown the wheel comprising a fixed circular member 1 and an auxiliary member 2. The fixed member is formed with an annular flange 3 to hold the pneumatic or other type of tire with which the wheel may be provided. The auxiliary member 2 is also provided with a flange 4 adapted to coöperate with the flange 3, and the two members have a bead and groove connection at their meeting edges.

The auxiliary member consists essentially of a flange complementary to the fixed member, the two constituting the tire holding rim. I have shown the auxiliary flange consisting of two parts 5 and 6 each of semi-circular formation and hinged to the fixed member at substantially diametrically opposite points, the portion 5 being hinged as at 7 and the portion 6 as at 8.

At its hinged ends I equip the flange with locking latches 9. As shown in Figs. 3 and 4 these are pivotally mounted upon one of the semi-circular portions as 5 by means of a bolt 10 passing laterally through the portion, the bolts preferably carrying a concaved face 12 at their inner ends to provide an even surface for the tire and prevent cutting it. The extremities of the flange 2 are cut away to receive the latches 9 and the latter are formed with flanges 13 which continue the groove or channel formed by the auxiliary member.

At appropriate points on the fixed member 1 I provide clamps 14. As illustrated these are secured to the fixed member by means of threaded bolts 15 formed on plates 16 secured to the inner surface of the fixed member. By loosening these bolt nuts the clamps may be swung around to permit the two parts of the auxiliary flange and the latches to be turned into and out of position. It will be readily apparent that when the two parts of the auxiliary member are released by their latches and swung outward the tire may be readily removed and replaced.

I claim as my invention:

1. A wheel comprising a fixed circular member, a flange complementary to said fixed member to form a tire holding rim, said flange consisting of two parts hinged to said fixed member and a latch carried by one of said parts near its hinge and adapted to engage the other member.

2. A wheel comprising a fixed circular member, a flange complementary to said fixed member to form a tire holding rim, said flange consisting of two parts hinged to said fixed member and a latch carried by one of said parts, a bolt forming the fulcrum for said latch and passed through said part, the face of the bolt head being beveled, and means for locking said flanged parts to said fixed member.

3. A wheel comprising a fixed circular member, a flange complementary to said fixed member to form a tire holding rim, said flange consisting of two parts each hinged to said fixed member at substantially diametrically opposite points and adapted to be swung outward from said fixed member to release the tire, each of said parts having a cutaway portion adjacent its hinge, a latching member fitting in said cutaway portions and forming a continuation of said flange, and means for securing said parts to said fixed member.

4. A wheel comprising a fixed circular member, a flange complementary to said fixed member to form a tire holding rim, said flange consisting of two parts each hinged to said fixed member at substantially diametrically opposite points and adapted to be swung outward from said fixed member to release the tire, and means for securing said parts to said fixed member including a member secured to one hinged part and overlapping the joint between said parts to form a continuation of said flange.

5. A wheel comprising a fixed circular member, a flange complementary to said fixed member to form a tire holding rim, said flange consisting of two semi-circular parts hinged to said fixed member and adapted to be swung outward from the latter, each of said parts having a cutaway portion adjacent its hinge, a flanged member fitting in said cutaway portions and overlapping the joint between said parts, and a series of clamps fulcrumed on said fixed member and adapted to engage said complementary flange and hold it against displacement.

In testimony whereof, I have signed this specification.

BERTRAND A. WEINBERG.